United States Patent
Demski et al.

(10) Patent No.: US 10,731,605 B1
(45) Date of Patent: Aug. 4, 2020

(54) MONOPROPELLANT CASCADE ROCKET ENGINE

(71) Applicants: Brandon A Demski, Jupiter, FL (US); Philip C Pelfrey, Jupiter, FL (US)

(72) Inventors: Brandon A Demski, Jupiter, FL (US); Philip C Pelfrey, Jupiter, FL (US)

(73) Assignee: Rocket Technology Holdings, LLC, Jupiter, FL (US)

( * ) Notice: Subject to any disclaimer, the term of this patent is extended or adjusted under 35 U.S.C. 154(b) by 295 days.

(21) Appl. No.: 15/915,108

(22) Filed: Mar. 8, 2018

Related U.S. Application Data

(63) Continuation of application No. 15/404,577, filed on Jan. 12, 2017, now abandoned.

(51) Int. Cl.
| | | |
|---|---|---|
| *F02K 9/68* | (2006.01) | |
| *B64G 1/40* | (2006.01) | |
| *F02K 9/52* | (2006.01) | |
| *F02K 9/95* | (2006.01) | |
| *F02K 9/42* | (2006.01) | |

(52) U.S. Cl.
CPC ............... *F02K 9/68* (2013.01); *B64G 1/401* (2013.01); *F02K 9/42* (2013.01); *F02K 9/425* (2013.01); *F02K 9/52* (2013.01); *F02K 9/95* (2013.01)

(58) Field of Classification Search
CPC . B64G 1/401; F02K 9/42; F02K 9/425; F02K 9/52; F02K 9/95; F02K 9/68
See application file for complete search history.

(56) References Cited

U.S. PATENT DOCUMENTS

| | | | | |
|---|---|---|---|---|
| 3,640,072 A | * | 2/1972 | Kayser | F02K 9/64 60/258 |
| 3,673,801 A | * | 7/1972 | Goldberger | C06D 5/04 60/218 |
| 6,272,846 B1 | * | 8/2001 | Schneider | C06B 47/06 60/218 |
| 8,652,402 B2 | * | 2/2014 | Zubrin | B01J 8/0285 422/4 |
| 2009/0148352 A1 | * | 6/2009 | Zubrin | C01B 13/0203 422/126 |

* cited by examiner

*Primary Examiner* — Todd E Manahan
*Assistant Examiner* — Kyle Robert Thomas
(74) *Attorney, Agent, or Firm* — John Ryznic

(57) ABSTRACT

A monopropellant rocket engine in which nitrous oxide is the propellant includes a catalyst bed on an end of a diverging combustion chamber to inject a first flow of monopropellant to ignite the monopropellant, followed by a series of additional monopropellant injections along the diverging combustion chamber where the previously injected monopropellant decomposes to be used to ignite the downstream injected monopropellant. When all monopropellant has been decomposed, the monopropellant is passed through a throat and nozzle to produce thrust. A control valve is used to regulate an amount of monopropellant injected at each point in order to regulate an amount of thrust.

9 Claims, 3 Drawing Sheets

US 10,731,605 B1

MONOPROPELLANT CASCADE ROCKET ENGINE

CROSS-REFERENCE TO RELATED APPLICATIONS

This application is a CONTINUATION of U.S. patent application Ser. No. 15/404,577 filed on Jan. 12, 2017 and entitled ETHYLENE AND NITROUS OXIDE PROPELLANT ROCKET ENGINE.

GOVERNMENT LICENSE RIGHTS

None.

BACKGROUND OF THE INVENTION

Field of the Invention

The present invention relates generally to a rocket engine, and more specifically to a monopropellant rocket engine that uses nitrous oxide as the propellant.

Description of the Related Art Including Information Disclosed Under 37 CFR 1.97 and 1.98

A serious limitation on the ability of the commercial and military aerospace industry to place into and keep satellites in Low-Earth-Orbit (LEO) at economical prices is the choice of propellants and propulsion technologies used for in-space propulsion including attitude control systems (ACS), reaction control systems (RCS), orbital maneuvering systems (OMS), and auxiliary power units (APU). Present systems are either liquid propellants that are hypergolic or cryogenic, or solid propellants, which are single use only, are not throttle-able, and are fundamentally explosive.

The cost associated with space travel and in-space propulsion continues to increase, in spite of efforts to reduce processing and operational costs of current systems. Major portions of the expenses are the result of safety requirements pertaining to the handling of highly toxic propellants and the high cost of the propellants. The limitations and cost of propulsion systems are a direct result of the propellants and propulsion technologies selected to satisfy the requirements of a mission. It is necessary to develop capabilities that reduce limitations and increase performance while maintaining reliability and function at a significantly lower cost.

Most propellants commonly used today have relatively low vapor pressure (lower than the rocket chamber pressure) and consequently have to be pressurized. This is accomplished in one of several ways. Turbo pumps are used for launch vehicle applications. The pumps are driven using onboard propellant and form part of the thermodynamic cycle for the system. For space applications, expulsion systems are used to pressurize the propellant and drive it out of the storage tank. Expulsion systems are either blow-down or regulated. Both versions use high pressure gas (either helium or nitrogen) to pressurize the liquid propellant in the storage tank.

For blow-down systems, the pressurant gas is stored in the same tanks with the propellant. As the propellant is consumed, tank pressure decays as does the thrust. Regulated systems keep a very high pressure source of pressurant gas, which is regulated down to the required tank pressure. As the propellant is consumed, the regulator maintains a constant tank pressure and thus corresponding constant thrust. Blow-down systems are used mainly for monopropellant thrusters, while regulated systems are used for bipropellant thrusters. Expulsion systems lower the useful tank volume and, in the case of regulated systems, add considerable dry weight. Blow-down systems can occupy over 20% of the tank volume. Regulated systems require a lower volume (around 3%) although a separate high-pressure tank is required to store the pressurant gas.

In a monopropellant rockets that depend on a chemical reaction, the power for the propulsive reaction and resultant thrust is provided by the chemical itself. That is, the energy needed to propel the spacecraft is contained within the chemical bonds of the chemical molecules involved in the reaction. The most commonly used monopropellant is hydrazine ($N_2H_4$), a chemical which is a strong reducing agent. Hydrazine is a toxic material that is highly regulated and relatively expensive to use. Hydrazine also requires a pressurant to force the propellant into the combustion chamber.

Chemical-reaction monopropellants are not as efficient as some other propulsion technologies. Engineers choose monopropellant systems when the need for simplicity and reliability outweigh the need for high delivered impulse. If the propulsion system must produce large amounts of thrust, or have a high specific impulse, as on the main motor of an interplanetary spacecraft, other technologies are used.

BRIEF SUMMARY OF THE INVENTION

A liquid rocket engine that uses nitrous oxide as a monopropellant, and where the nitrous oxide is introduced into a diverging combustion chamber in stages in a process of cascade decomposition. A small portion of the nitrous oxide is introduced in the first stage and is decomposed by a small catalyst bed with low power requirements commensurate with the flow rate of nitrous oxide. This decomposed nitrous is then used to decompose more nitrous oxide introduced at a downstream or second stage, and that flow is used to decompose more, until all of it is decomposed. The number of stages can be increased to the desired thrust level, while still using the low power requirement associated with the initial flow rate. The decomposed nitrous oxide is then passed through a throat and then a nozzle to produce thrust.

DETAILED DESCRIPTION OF THE INVENTION

The present invention is a rocket engine that uses nitrous oxide as a monopropellant in which the nitrous oxide is injected in a series of stages within a diverging combustion chamber so that an upstream stage of nitrous oxide decomposes and is used to decompose downstream stages of nitrous oxide until all nitrous oxide is decomposed.

Nitrous oxide can be catalytically decomposed using a wide variety of catalysts, including platinum, iridium, rhodium, tungsten carbide, copper, cobalt, and gold. The decomposition process is exothermic resulting in nitrogen and oxygen near 3,000 degrees Fahrenheit. This hot oxidizer will decompose nitrous oxide on contact and will facilitate sustained decomposition in a rocket combustion chamber. Using the process, auto-ignition and rigorous and complete decomposition can be accomplished using a stable, non-toxic, and storable propellant.

Nitrous oxide is a standard liquefied industrial gas and is not categorized as explosives or hazardous to work with or handle. The liquid propulsion system of the present invention uses this environmentally benign propellant, which is economically advantageous to current hypergolic or cryogenic systems. It possesses commercial availability at low prices and is easy to handle, thereby producing a significant reduction in operating costs.

Figure 1:
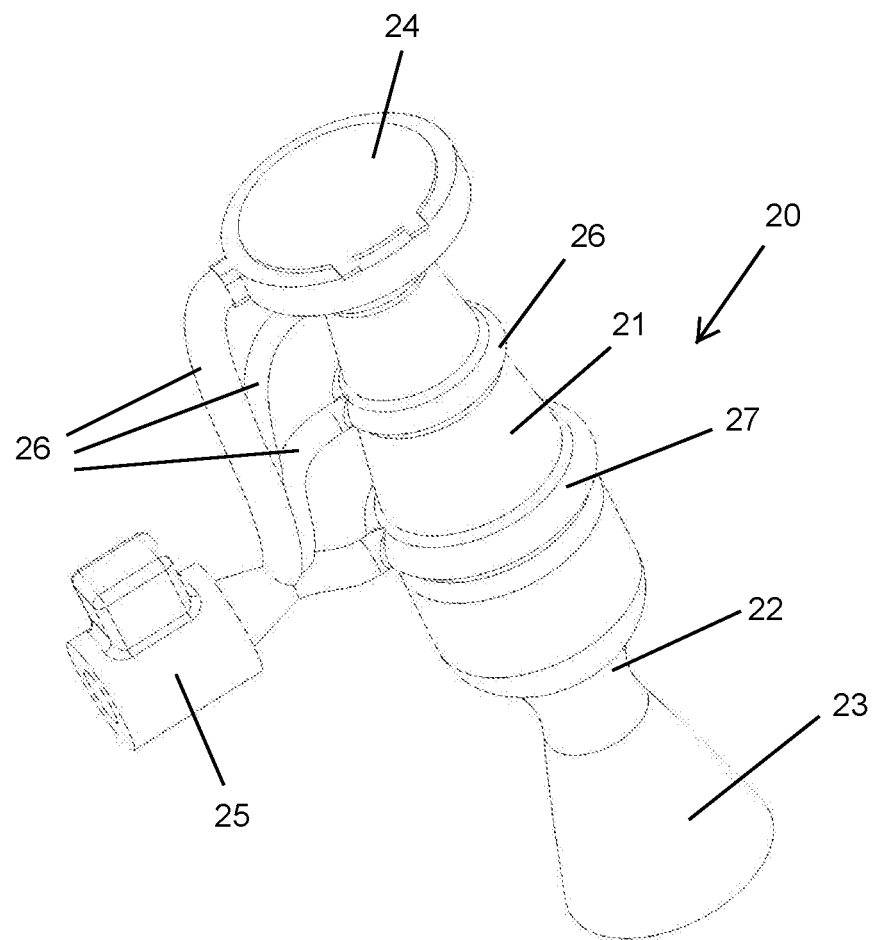
FIG. 1 shows an isometric view of a rocket engine of the present invention in which nitrous oxide is used as a monopropellant.

An embodiment of the rocket engine of the present invention is shown in FIG. 1. The rocket engine 20 of FIG. 1 is a monopropellant rocket engine that uses nitrous oxide injected in stages to produce a complete decomposition of the nitrous oxide. The rocket engine 20 includes a diverging combustion chamber 21, a throat 22, and a nozzle 23. A catalyst bed 24 encloses an upstream open end of the combustion chamber 21. A control valve 25 controls a delivery of nitrous oxide to the various injector stages of the rocket engine 20. Monopropellant passages 26 connect the control valve 25 to the various stages where the monopropellant is injected into the combustion chamber 21. In this embodiment, the monopropellant is injected into the catalyst bed 24 first, followed by a second stage 26 and a third stage 27.

Figure 2:
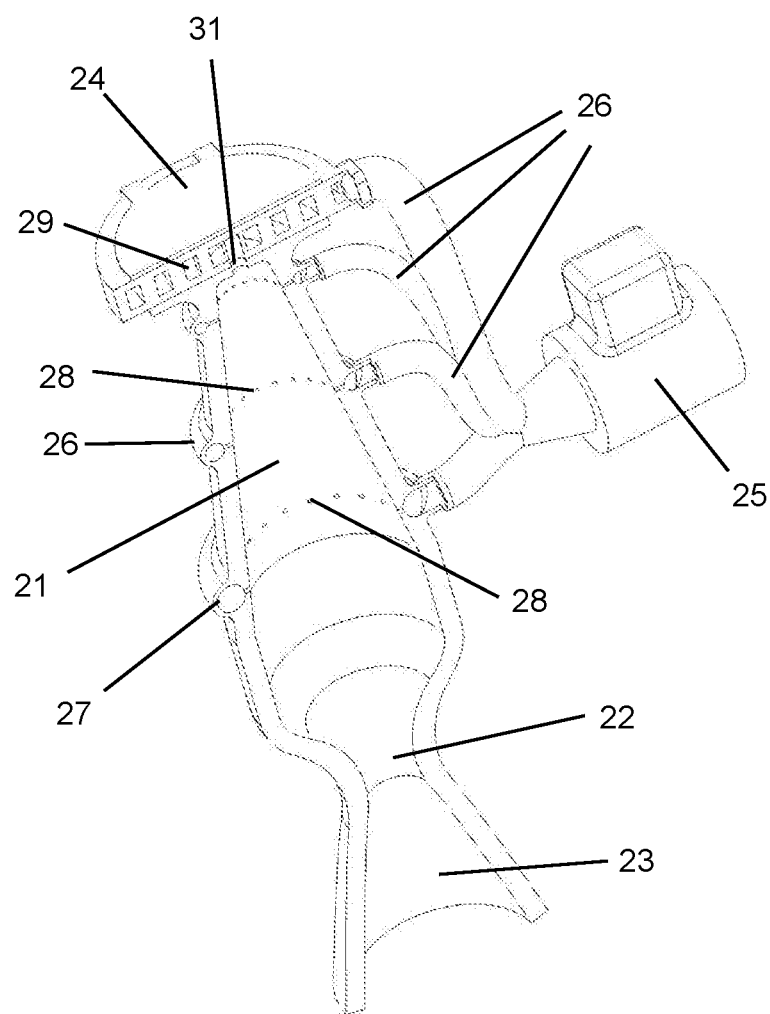
FIG. 2 shows a cut-away view of the rocket engine of FIG. 1.
Figure 3:
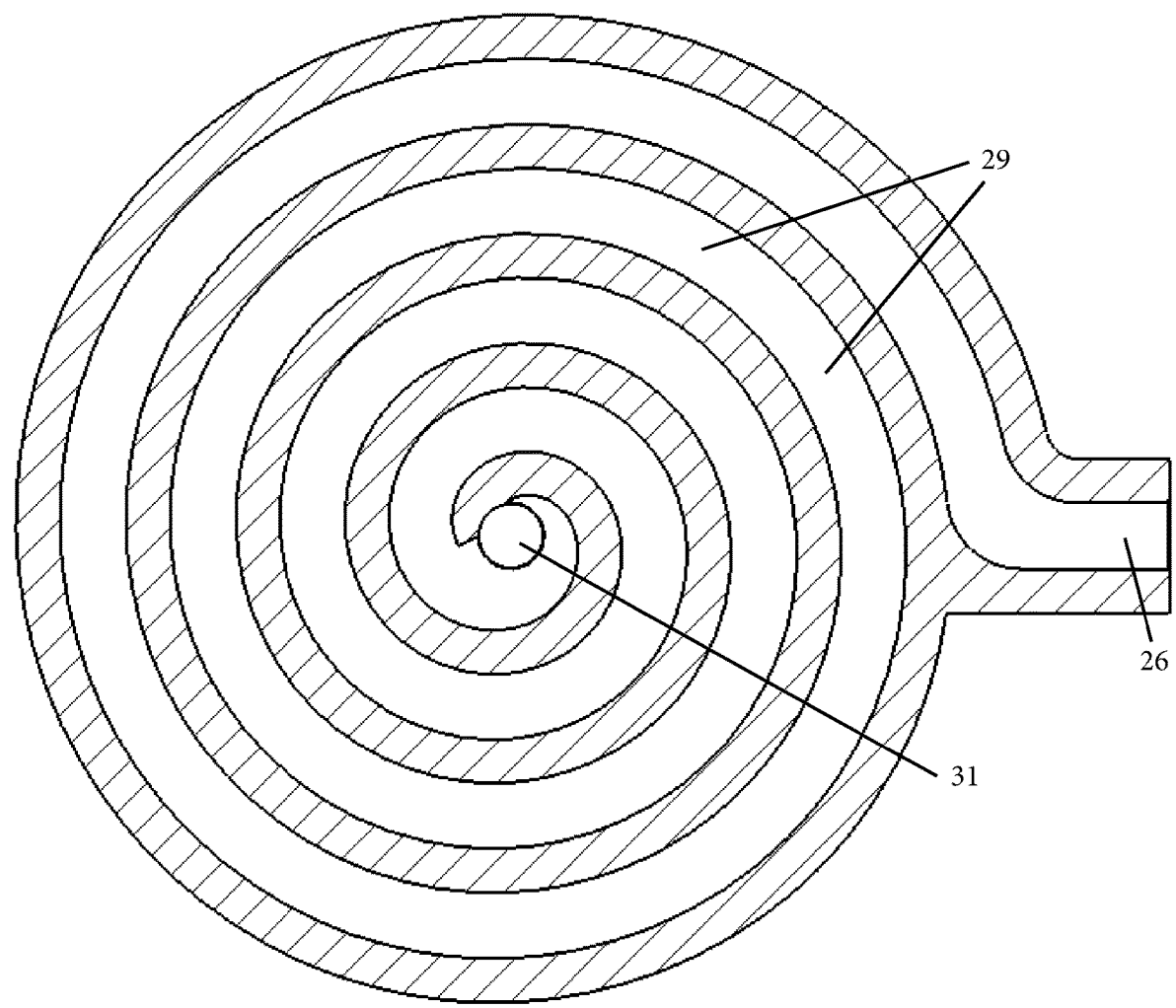
FIG. 3 shows a cross section top view of the catalyst bed with the spiral shaped passage.

FIG. 2 shows a cut-away view of the rocket engine 20 of FIG. 1. The catalyst bed 24 includes a spiral shaped monopropellant passage connected to one of the monopropellant supply passages 26 on an inlet and to a discharge hole 31 at the outlet. FIG. 3 shows a cross section top view of the spiral shaved monopropellant passage 29 of the catalyst bed 24 with the inlet on the outer side of the round shaped catalyst bed and the discharger hole 31 located around a center of the diverging combustion chamber 21. The catalyst bed includes an electric heater to heat the bed and decompose the nitrous oxide flowing within the spiral shaped passage. The nitrous oxide discharged from the discharge hole 31 flows through the diverging combustion chamber 21 where additional nitrous oxide is injected through an annular arrangement of injector holes 28 supplied by another of the supply passages 26. The decomposed monopropellant from the discharge hole 31 will function to decompose the monopropellant injected at the second stage injector holes 28 to decompose the additional monopropellant injected. A third stage of injector holes 28 is located downstream from the second stage and within the diverging combustion chamber to be decomposed by the nitrous oxide from the catalyst bed 24 and the second stage of injector holes 28. The FIG. 2 embodiment of the rocket engine with the monopropellant of nitrous oxide shows one discharge hole 31 and two stages of injection holes, but more than two stages of injection holes 28 could be used.

The control valve 25 is of the type such that a flow of nitrous oxide can be regulated through each of the supply passages 26 in which little or no monopropellant can flow. This is such that the monopropellant rocket engine 20 of the FIG. 1 embodiment can be used with a wide range of thrust. All of the supply passages 26 can be used for a ground based launch of a vehicle, or all but the central discharge hole 31 can be supplied with a low flow (all other supply passages 26 blocked off) and operated as pulses such that a positioning engine can be used.

We claim the following:

1. A monopropellant rocket engine comprising:
   a combustion chamber;
   a throat downstream from the combustion chamber;
   a nozzle downstream from the throat;
   the combustion chamber having a diverging shape;
   a catalyst bed closing an end of the combustion chamber;
   the catalyst bed having a spiral shaped passage from an inlet to an outlet for a monopropellant with the outlet discharging into the combustion chamber;
   the catalyst bed forms a substantially flat plate perpendicular to a central axis of the combustion chamber;
   the spiral shaped passage enclosed within the catalyst bed having the inlet on an outer side of the catalyst bed and the outlet into the combustion chamber at substantially the central axis of the combustion chamber;
   a heater associated with the catalyst bed to decompose the monopropellant flowing through the spiral shaped passage; and,
   a first plurality of monopropellant injection holes downstream of the outlet of the spiral shaped passage to inject additional monopropellant into the combustion chamber.

2. The monopropellant rocket engine of claim 1, and further comprising:
   the monopropellant is nitrous oxide.

3. The monopropellant rocket engine of claim 1, and further comprising:
   a second plurality of monopropellant injection holes downstream of the first plurality of monopropellant injection holes to inject additional monopropellant into the combustion chamber.

4. The monopropellant rocket engine of claim 1, and further comprising:
   the first plurality of monopropellant injection holes is an annular arrangement of injection holes each substantially perpendicular to a central axis of the combustion chamber.

5. A process for operating a monopropellant rocket engine comprising the steps of:
   passing the first flow of monopropellant through a spiral shaped passage formed in a catalyst bed to decompose the first flow of monopropellant;
   discharging the first flow of monopropellant into a diverging combustion chamber;
   discharging a second flow of the monopropellant into the diverging combustion chamber downstream from the first flow of monopropellant such that the first flow of monopropellant will decompose the second flow of monopropellant;
   discharging a third flow of the monopropellant into the diverging combustion chamber downstream from the second flow of monopropellant such that the second flow of monopropellant will decompose the third flow of monopropellant; and,
   discharging the decomposed monopropellant through a throat and a nozzle to produce thrust;
   wherein the catalyst bed forms a substantially flat plate perpendicular to a central axis of the diverging combustion chamber;
   the spiral shaped passage enclosed within the catalyst bed having an inlet on an outer side of the catalyst bed and an outlet into the combustion chamber at substantially the central axis of the combustion chamber.

6. The process for operating a monopropellant rocket engine of claim 5, and further comprising the step of:
   Using nitrous oxide as the monopropellant.

7. The process for operating a monopropellant rocket engine of claim 5, and further comprising step of:
   using a heater to decompose the first flow of monopropellant.

8. The process for operating a monopropellant rocket engine of claim 5, and further comprising the step of:
   discharging the second flow of monopropellant through an annular arrangement of injection holes substantially perpendicular to the central axis of the combustion chamber.

9. The process for operating a monopropellant rocket engine of claim 5, and further comprising the steps of:
   regulating a flow of monopropellant through the first and second and third flows of monopropellant to control an amount of thrust produced.

* * * * *